(12) United States Patent
Waters

(10) Patent No.: US 11,707,996 B2
(45) Date of Patent: Jul. 25, 2023

(54) WIRELESS CHARGING WITH MULTIPLE CHARGING LOCATIONS

(71) Applicant: WiBotic Inc., Seattle, WA (US)

(72) Inventor: Benjamin Waters, Kirkland, WA (US)

(73) Assignee: WiBotic Inc., Seattle, WA (US)

(*) Notice: Subject to any disclaimer, the term of this patent is extended or adjusted under 35 U.S.C. 154(b) by 0 days.

(21) Appl. No.: 15/843,943

(22) Filed: Dec. 15, 2017

(65) Prior Publication Data
US 2019/0184842 A1 Jun. 20, 2019

(51) Int. Cl.
| | | |
|---|---|---|
| *B60L 53/12* | (2019.01) | |
| *B60L 53/36* | (2019.01) | |
| *B60L 53/38* | (2019.01) | |
| *H02J 50/90* | (2016.01) | |
| *H02J 50/80* | (2016.01) | |
| *H02J 50/10* | (2016.01) | |
| *H02J 50/40* | (2016.01) | |
| *H02J 7/00* | (2006.01) | |
| *B60L 53/30* | (2019.01) | |

(52) U.S. Cl.
CPC ............. *B60L 53/12* (2019.02); *B60L 53/36* (2019.02); *B60L 53/38* (2019.02); *H02J 7/0071* (2020.01); *H02J 7/00712* (2020.01); *H02J 50/10* (2016.02); *H02J 50/40* (2016.02); *H02J 50/80* (2016.02); *H02J 50/90* (2016.02); *B60L 53/305* (2019.02); *H02J 7/005* (2020.01); *H02J 7/0048* (2020.01)

(58) Field of Classification Search
CPC ..................................................... B60L 53/126
See application file for complete search history.

(56) References Cited

U.S. PATENT DOCUMENTS

| | | | |
|---|---|---|---|
| 4,455,523 A | 6/1984 | Koenck | |
| 5,304,916 A | 4/1994 | Le et al. | |
| 5,572,110 A | 11/1996 | Dunstan | |
| 9,371,007 B1 * | 6/2016 | Penilla | B60L 11/1848 |
| 9,455,599 B2 | 9/2016 | Tanabe | |
| 9,774,208 B2 * | 9/2017 | Qian | H02J 7/025 |
| 10,090,699 B1 * | 10/2018 | Leabman | H02J 50/20 |
| 10,618,651 B2 | 4/2020 | Waters | |
| 2002/0073322 A1 | 6/2002 | Park et al. | |
| 2005/0127868 A1 | 6/2005 | Calhoon et al. | |
| 2007/0123303 A1 | 5/2007 | Book et al. | |
| 2009/0026844 A1 * | 1/2009 | Iisaka | H02J 50/10 |
| | | | 307/104 |

(Continued)

FOREIGN PATENT DOCUMENTS

| | | |
|---|---|---|
| WO | WO 2013/177205 | 11/2013 |
| WO | WO 2016/019159 | 2/2016 |
| WO | WO 2019/118645 | 6/2019 |

OTHER PUBLICATIONS

"International Search Report and Written Opinion Issued in PCT Application No. PCT/US18/65287", dated Mar. 25, 2019, 11 Pages.

(Continued)

*Primary Examiner* — Drew A Dunn
*Assistant Examiner* — Tynese V McDaniel
(74) *Attorney, Agent, or Firm* — Knobbe Martens Olson & Bear LLP

(57) ABSTRACT

A charging status or a location of a wireless charger is provided. A vehicle may charge at a particular wireless charger based at least in part on the charging status of the wireless charger and/or the location of the wireless charger.

35 Claims, 10 Drawing Sheets

(56) References Cited

U.S. PATENT DOCUMENTS

| | | | |
|---|---|---|---|
| 2011/0221604 A1 | 9/2011 | Johnson | |
| 2012/0161538 A1 | 6/2012 | Kinoshita et al. | |
| 2012/0161696 A1 | 6/2012 | Cook et al. | |
| 2012/0235508 A1* | 9/2012 | Ichikawa | H04B 5/0093 307/104 |
| 2012/0235636 A1 | 9/2012 | Partovi | |
| 2012/0280653 A1* | 11/2012 | Prosser | B60L 53/30 320/109 |
| 2012/0293006 A1* | 11/2012 | Kim | H04B 5/0031 307/104 |
| 2012/0299391 A1* | 11/2012 | Tanabe | H02J 50/12 307/104 |
| 2013/0176104 A1 | 7/2013 | Rich et al. | |
| 2013/0215979 A1* | 8/2013 | Yakovlev | H04B 5/0037 375/256 |
| 2014/0008976 A1 | 1/2014 | Yebka et al. | |
| 2014/0012448 A1* | 1/2014 | Tripathi | G05D 1/0276 701/22 |
| 2014/0015328 A1 | 1/2014 | Beaver et al. | |
| 2014/0021913 A1 | 1/2014 | Martin | |
| 2014/0145675 A1* | 5/2014 | Shimizu | H04B 5/0075 320/108 |
| 2014/0162554 A1 | 6/2014 | Sankar et al. | |
| 2014/0239733 A1 | 8/2014 | Mach et al. | |
| 2015/0015419 A1* | 1/2015 | Halker | B60L 53/124 340/901 |
| 2015/0239365 A1 | 8/2015 | Hyde et al. | |
| 2015/0244201 A1 | 8/2015 | Chu | |
| 2015/0249339 A1* | 9/2015 | Van Wageningen | H04B 5/0037 307/104 |
| 2015/0280444 A1 | 10/2015 | Smith et al. | |
| 2015/0303700 A1* | 10/2015 | Nakano | H02J 7/00036 307/104 |
| 2015/0336669 A1 | 11/2015 | Kantor et al. | |
| 2016/0006263 A1* | 1/2016 | Shichino | H02J 50/60 307/104 |
| 2016/0126749 A1 | 5/2016 | Shichino | |
| 2016/0214714 A1* | 7/2016 | Sekelsky | B64C 39/024 |
| 2017/0110901 A1* | 4/2017 | Amarasekara | B64F 1/007 |
| 2017/0136631 A1* | 5/2017 | Li | B25J 19/005 |
| 2017/0169712 A1* | 6/2017 | Penilla | G05D 1/0011 |
| 2017/0170687 A1* | 6/2017 | Wu | H04W 12/50 |
| 2017/0187355 A1 | 6/2017 | Yang et al. | |
| 2017/0237301 A1 | 8/2017 | Elad et al. | |
| 2017/0240061 A1* | 8/2017 | Waters | H02J 7/025 |
| 2017/0244270 A1 | 8/2017 | Waters et al. | |
| 2017/0250735 A1* | 8/2017 | Okamoto | H04B 5/0037 |
| 2017/0288739 A1* | 10/2017 | Shin | H04W 36/08 |
| 2017/0317529 A1 | 11/2017 | Smith et al. | |
| 2018/0105053 A1* | 4/2018 | Ahmed | B60L 11/1833 |
| 2018/0118045 A1* | 5/2018 | Gruzen | B60L 53/665 |
| 2018/0131408 A1 | 5/2018 | Austad | |
| 2018/0281612 A1* | 10/2018 | Perry | G01C 21/3614 |
| 2019/0025830 A1* | 1/2019 | O'Brien | H02J 50/12 |
| 2019/0190319 A1* | 6/2019 | Kawamae | B60L 53/12 |
| 2020/0105149 A1 | 4/2020 | Mahkonen et al. | |
| 2020/0251936 A1* | 8/2020 | Smith | H02J 7/00045 |

OTHER PUBLICATIONS

Office Action dated Apr. 5, 2021 in U.S. Appl. No. 15/844,124.
International Search Report and Written Opinion for PCT/US2017/018766 dated Jun. 9, 2017 in 9 pages.

* cited by examiner

WIRELESS CHARGING WITH MULTIPLE CHARGING LOCATIONS

CROSS-REFERENCE TO RELATED APPLICATIONS

This application is related to a U.S. non-provisional patent application entitled, "Device Authentication for Wireless Charging," filed the same day as the instant application.

TECHNICAL FIELD

This disclosure relates generally to batteries and charging systems, and in particular to wirelessly charging battery powered vehicles.

BACKGROUND INFORMATION

Battery powered devices such as drones, robots, submarines, satellites, electric cars, electric trucks, electric bikes, and other devices and vehicles may require battery charging. Wireless charging of these battery powered devices may offer reduced down-time and increase deployment efficiencies of the devices. Increasing the efficiency of the devices is desirable when more than one wireless charger is available to wirelessly charge a device or plurality of devices.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
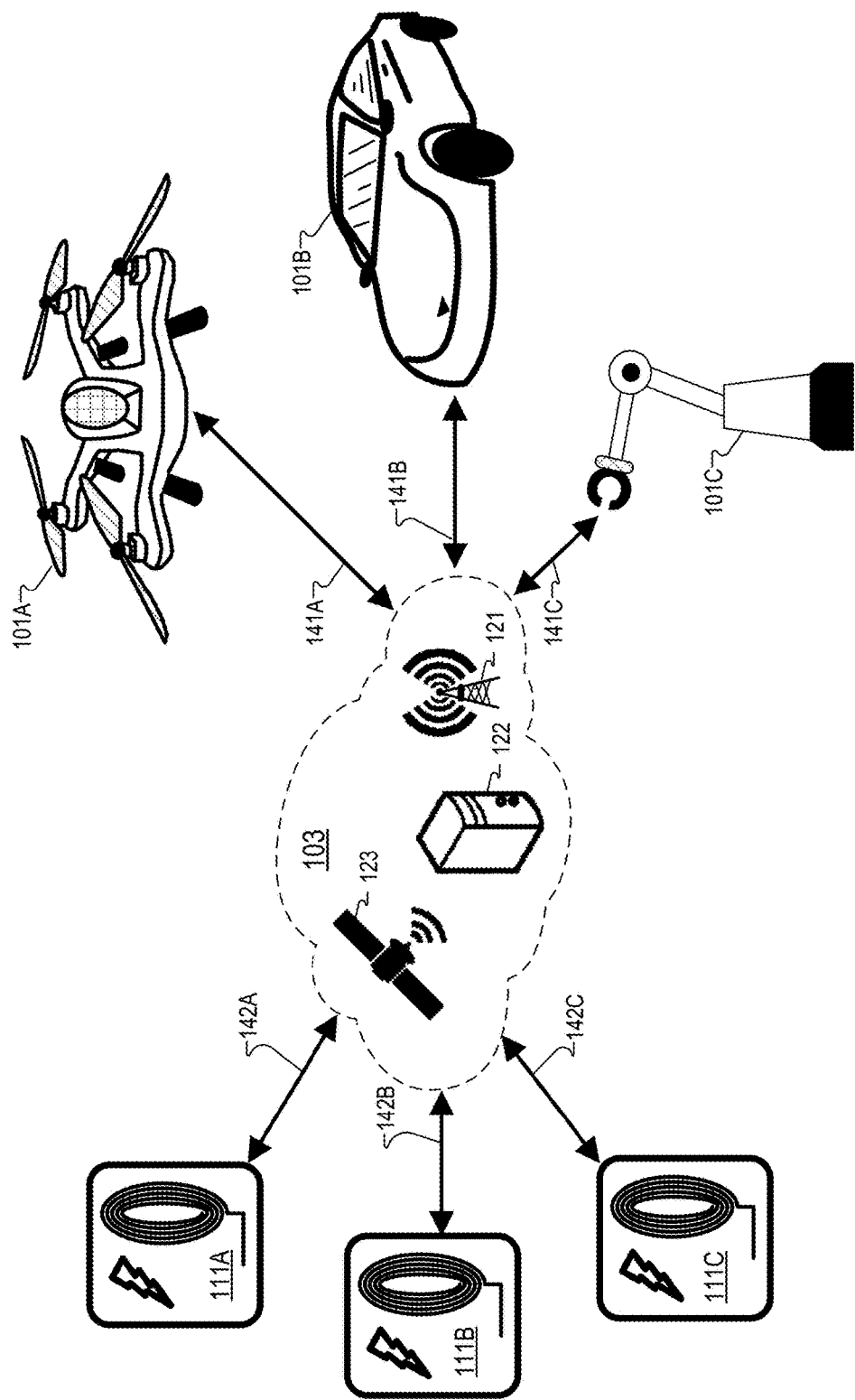
FIG. 1 is an example system that includes a plurality of wireless chargers and devices that can receive wireless energy from the wireless chargers to charge batteries of the devices, in accordance with an embodiment of the disclosure.

Embodiments of a system, apparatus, and method of identifying wireless charging availability and authenticating devices for wireless charging are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

Many electronic devices include a battery that can be charged and recharged. Many times, the battery of the device is recharged by connecting the device to a charger with a charging wire. With conventional manual or mechanical re-charging, a mechanical connection is required to plug the device in for charging, and the physical connection comes apart when charging is complete. Automatically making and breaking mechanical connections has the following problems: (1) it is unreliable (often the operation fails due to sensing or actuating errors); (2) it leads to wear of contacts/connectors, which fail after a certain number of plug/unplug cycles; (3) it adds cost and complexity to the system, since some form of robot arm, human intervention or mechanical contact is needed to accomplish the plugging and un-plugging (and often these mechanisms must produce large amounts of force, adding to its cost and complexity); and (4) the additional mechanical parts in the charging mechanism are a further source of system-level unreliability, as the exposed ohmic contacts are prone to corrosion and are affected by water and humidity due to the environmental conditions. Thus, some contexts benefit from wirelessly charging a device to reduce human intervention and increase reliability.

In a particular illustrative context, drones used in aerial photography, are typically human supervised. When the drone runs out of power, a person plugs the drone into a charger. To enable new, autonomous drone applications, such as unattended, automatic daily inspection of a field or bridge, with the human operator absent, it is desirable for drones to be able to charge themselves.

In some system implementation, there may be a plurality of devices and a plurality of wireless chargers for charging those devices. When the devices are also vehicles having propulsion to navigate to the wireless chargers to gain contactless power, the system may improve efficiency from coordinating the charging of the devices at particular wireless chargers. In embodiments of the disclosure, a wireless charger may provide charging station data that allows the devices to locate the wireless charger to receive contactless power. The charging station data may also provide intelligence, such as a charging status of the wireless charger, so that the device will have charging availability of a particular wireless charger. The devices may navigate to a wireless charger based on the location of the wireless charger and/or the charging availability of the wireless charger. The device may receive the charging station data (e.g. location and/or charging availability) of more than one wireless charger and select and navigate to one of the plurality of wireless chargers based at least in part on the charging station data.

Emerging applications that may benefit from the disclosure include aerial, mobile, and aquatic robots. "Drones" are aerial vehicles, typically quad-copters with 4 (or more) electrically driven rotors. Aerial vehicles can also be embodied by fixed-wing unmanned aircraft driven by electrical motors. Conventional drones may typically operate for 10 minutes to 40 minutes before needing to recharge. Mobile robots drive along a surface using one or more electric motors to drive wheels and move the device. Mobile robots are used in many consumer, industrial, medical, retail, defense and security applications today. Aquatic robots drive above or below the surface of water using turbines or buoyancy pumps to propel the device in three-dimensional space. All of these types of robotic devices typically have batteries on the device that need to be recharged. Of course, devices such as forklifts, golf carts, electric vehicles, autonomous vehicles, and other devices may also benefit from wireless charging to receive contactless power in accordance with embodiments of this disclosure.

FIG. 1 is an example system 100 that includes a plurality of wireless chargers 111 and devices 101 that can receive wireless energy from the wireless chargers 111 to charge batteries of the devices 101, in accordance with an embodiment of the disclosure. FIG. 1 includes wireless chargers 111A, 111B, and 111C (collectively referred to as wireless chargers 111) and devices 101A, 101B, and 101C (collectively referred to as devices 101). Device 101A is an aerial drone, device 101B is an electric car, and device 101C is a land-based robot. Electric car 101B may be an autonomous car in some embodiments. Of course, system 100 may include a plurality of devices 101A, 101B, and/or 101C and other devices or vehicles could be included in system 100.

In embodiments of the disclosure, wireless chargers 111 may "broadcast" charging station data for use by devices 101. The charging station data may include a location of the wireless charger or a charging station identifier that can be used to identify a location of the wireless charger. The charging station data may also include charging availability data of the wireless charger. For example, if the wireless charger is presently charging a device, this may be reflected in the charging availability data so that device(s) 101 will be informed that a particular wireless charger is currently occupied. The devices 101 may receive the "broadcast" from a plurality of wireless chargers and then navigate to a particular wireless charger from the plurality of wireless chargers based at least in part on the data provided in the broadcasts from the plurality of wireless chargers. The devices may also take into account wind data, geographical data, and remaining battery capacity of the device, for example.

In FIG. 1, wireless charger 111A broadcasts via communication channel 142A, wireless charger 111B broadcasts via communication channel 142B, and wireless charger 111C broadcasts via communication channel 142C. Also in FIG. 1, device 101A receives data via communication channel 141A, device 101B receives data via communication channel 141B, and device 101C receives data via communication channel 141C. In some embodiments, the broadcast(s) of the wireless chargers 111 are relayed to the devices 101A via a communication network 103. Communication Network 103 may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels 141 and 142 may include or be routed through one or more wired or wireless communication utilizing IEEE 802.11 protocols, Bluetooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

In one illustrative embodiment, one or more wireless chargers 111 utilize an Ethernet connection as communication channel 142 and "broadcast" charging station data to a server 122 that is included in communication network 103. Server 122 computer may be located remotely in a data center or located local to the wireless charger 111. Server 122 may then send the data to the device(s) 101 via cellular network 121 or satellite network 123, for example. Of course, when device(s) 101 receive the charging station data from a satellite, communication channel 141 is satellite communication channel and when device(s) 101 receive the charging station data from a cellular tower, communication channel 141 is a cellular communication channel.

In one embodiment, server 122 may aggregate charging station data from multiple wireless chargers 111 and forward the aggregated data to devices 101. In one embodiment, server 122 may filter the charging station data by location of the wireless charger and only forward to the devices 101 the charging station data from wireless chargers that are within a certain distance of the device. The device may report a location (e.g. GPS location) to the server 122 for the purposes of filtering the charging station data that is forwarded to the device 101. For example, a device may only receive charging station data for wireless chargers 111 that are within 5 miles of the device. Of course, other distances may be used as a filter.

In one illustrative embodiment, one or more wireless chargers 111 use a cellular communication channel 142 to "broadcast" charging station data and the charging station data is received by the device(s) 101 on a cellular communication channel 141.

In one illustrative embodiment, wireless charger(s) 111 communicate directly with devices 101 and communication network 103 is not utilized. Rather, wireless charger(s) 111 may broadcast a wireless signal that is received by devices 101. For example, wireless charger 111 may broadcast a WiFi signal on communication channel 142 and that same WiFi signal may be received directly by device(s) 101. In some embodiments, the device(s) 101 may initiate an initial handshake to establish wireless communications with the wireless charger(s) 111 before the wireless charger(s) 111 "broadcast" their charging station data to the device(s) 101. In other embodiments, the wireless charger(s) 111 may initiate an initial handshake to establish wireless communication with the device(s) 101 before the wireless charger(s) "broadcast" their charging station data to the device(s) 101.

Figure 2:
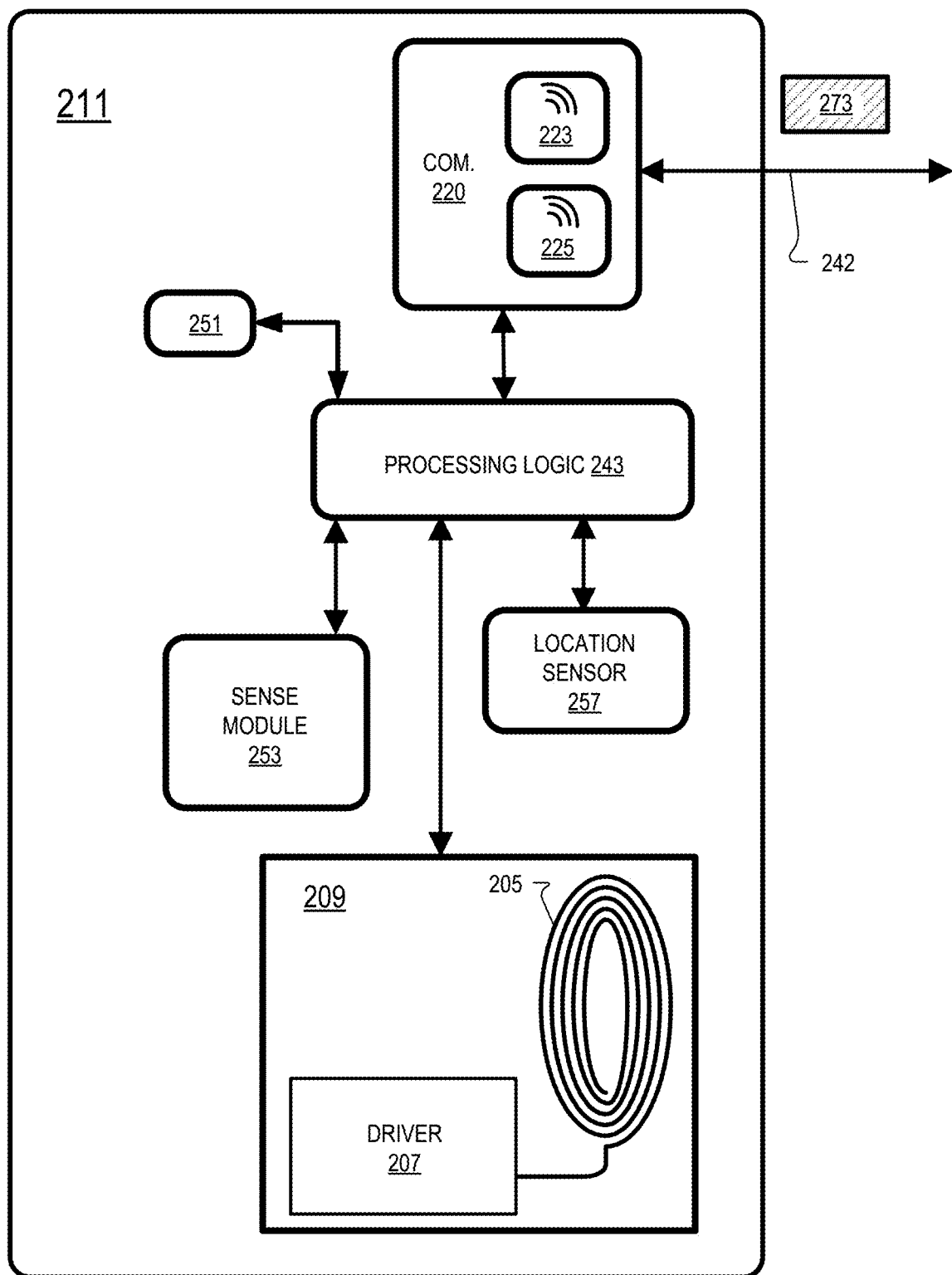
FIG. 2 illustrates an example wireless charger including a communication interface and a transmit charging coil to deliver wireless energy to a receive charging coil, in accordance with an embodiment of the disclosure.

FIG. 2 illustrates an example wireless charger 211 including a communication interface 220 and a transmit charging coil 205 to deliver wireless energy to a receive charging coil, in accordance with an embodiment of the disclosure. Wireless charger 211 includes wireless power transmitter 209 that includes a driver 207 coupled to the transmit charging coil 205. Driver 207 drives a signal onto transmit charging coil 205 to facilitate wireless energy delivery to a receive charging coil configured to receive the wireless energy. The receive charging coil may be included in or attached with a device 101. Wireless charger 211 also includes processing logic 243, location sensor 257, sense module 253, and memory 251. Memory 251 may store a charging station identifier of the wireless charger 211 and other data and/or instructions for execution by processing logic 243.

Processing logic 243 is coupled to wireless power transmitter 209. Processing logic 243 may control driver 207 to adjust the output of transmit charging coil 205. Processing logic 243 is communicatively coupled to location sensor 257, in FIG. 2. In one embodiment, location sensor 257 is a global positioning satellite (GPS) sensor providing GPS coordinates to processing logic 243. Processing logic 243 is also communicatively coupled to sense module 253 in FIG. 2. Sense module 253 may include one or more proximity sensors, image sensors, or thermal cameras. The proximity sensor, image sensors, or thermal cameras may be positioned to detect the presence of humans, animals, or interfering objects. When a human, animal, or interfering object is sensed, processing logic 243 may disable the wireless charging of wireless charger 211 for safety purposes. Sense module 253 may also detect the presence of a proximate device that is being charged by wireless charger 211. When a device is currently being charged by wireless charger 211, processing logic 243 may update charging availability data of the charger 211 to reflect the charging availability of the wireless charger 211.

Processing logic 243 is communicatively coupled to communication interface 220. Communication interface 220 may include one or more separate communication interfaces. Communication interface 220 may include wired (e.g. Ethernet) and wireless (e.g. WiFi, cellular, Bluetooth, and/or RFID) communication interfaces. In the illustrated embodiment, communication interface 220 includes a wireless interface 223 configured for IEEE 802.11 communication and a radio frequency identification (RFID) interface 225. RFID interface 225 may include an RFID "reader" that transmits RFID challenge signals. Communication interface 220 may send and receive data via one or more communication channels 242. Wireless charger 211 may send and/or receive data 273 (e.g. charging station data) via communication channel 242. In some embodiments, communication channel 242 is a wireless communication channel using a time division multiple access (TDMA) protocol to communicate with multiple devices and performs a clear-channel-assessment to ensure that the wireless communication channel 242 is not already occupied by other proximate communication systems (e.g. WiFi or remote control). This allows multiple devices to communicate with charger 211, if needed.

Figure 3:
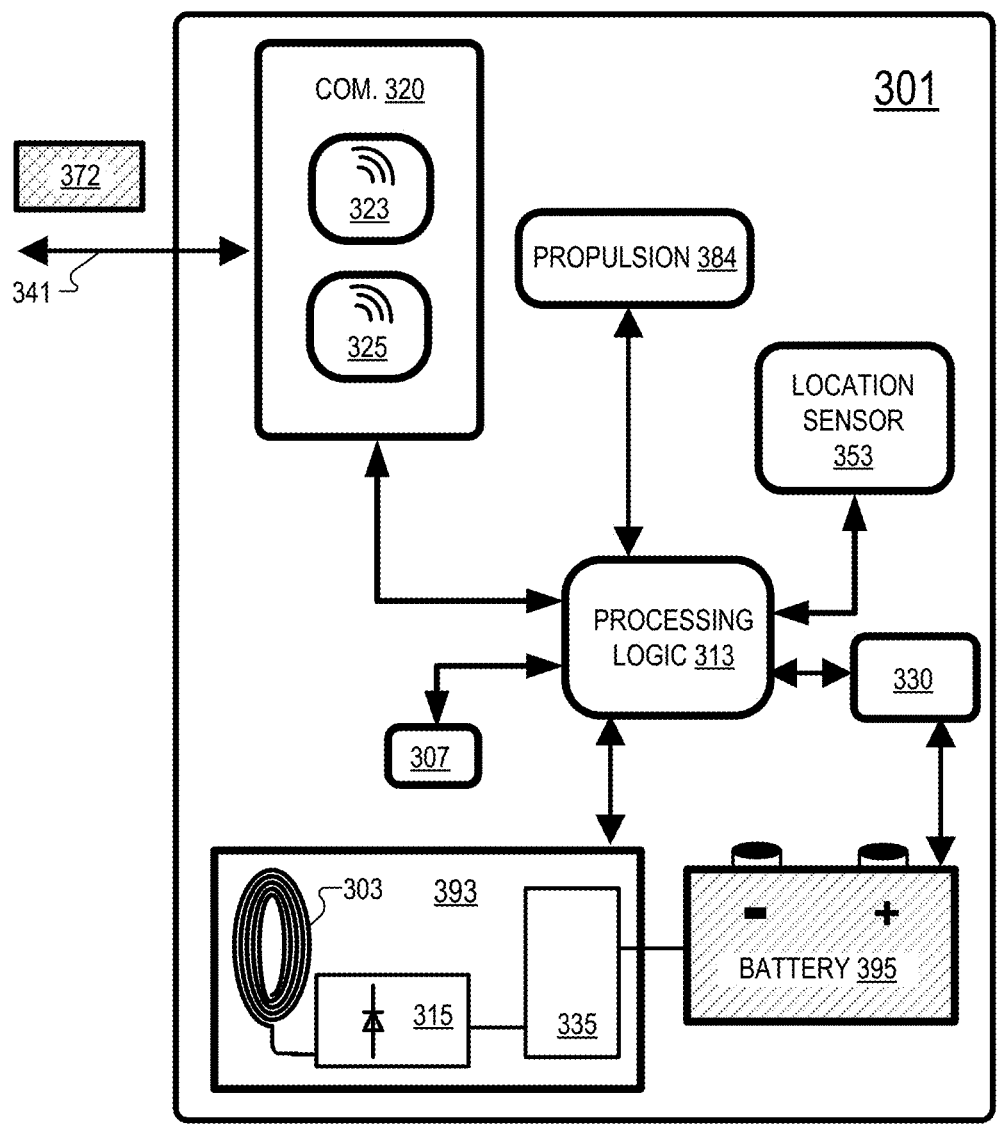
FIG. 3 illustrates an example device that includes a wireless communication interface, a receive charging coil, and a propulsion mechanism, in accordance with an embodiment of the disclosure.

FIG. 3 illustrates an example device 301 that includes a wireless communication interface 320, a receive charging coil 303, and a propulsion mechanism 384, in accordance with an embodiment of the disclosure. Device 301 also includes a wireless energy receiving module 393, a battery 395, a memory 307, a measurement module 330, and a location sensor 353. Battery 395 may include multiple battery cells. In one example, battery 395 includes six battery cells. Battery 395 may include lithium-ion, nickel cadmium, or other battery chemistry. Wireless energy receiving module 393 includes a receive charging coil 303, rectifier circuitry 315, and power regulator 335. Wireless energy received by receive charging coil 303 is rectified by rectifier 315 and regulated by power regulator 335 to charge battery 395 in the illustrated wireless energy receiving module 393 of FIG. 3. Rectifier 315 may include a full-wave bridge rectifier and power regulator 335 may include a PMIC (power management integrated circuit) such as a linear regulator, switching power supply, and/or switching regulator.

Processing logic 313 is coupled to wireless energy receiving module 393. Processing logic 313 may control wireless energy receiving module 393 to adjust the charge/discharge of battery 395. Additionally, processing logic 313 may receive electrical measurements from wireless energy receiving module 393. Processing logic 313 is also coupled to measurement module 330 that may measure a voltage or a current of battery 395. Measurement module 330 may include an analog-to-digital converter coupled to measure the voltage of battery 395 and/or a voltage representative of a current of battery 395. Memory 307 is communicatively coupled to processing logic 313 in FIG. 3 and processing logic 313 may read and write to memory 307. Data and instructions to be executed by processing logic 313 may be stored in memory 307. Location sensor 353 is coupled to processing logic 313 to provide a location of device 301. In one embodiment, location sensor 353 is a GPS sensor and provides GPS coordinates to processing logic 313.

Processing logic 313 is communicatively coupled to communication interface 320. Communication interface 320 may include one or more separate communication interfaces. Communication interface 320 may include wired (e.g. Ethernet) and wireless (e.g. WiFi, cellular, Bluetooth, and/or RFID) communication interfaces. In the illustrated embodiment, communication interface 320 includes a wireless interface 323 configured for IEEE 802.11 communication and a radio frequency identification (RFID) interface 325. RFID interface 325 may include an RFID "tag" that generates an RFID response signal when queried by an RFID challenge signal from an RFID reader. Communication interface 320 may send and receive data via one or more communication channels 341. Device 301 may send and/or receive data 372 (e.g. charging station data) via communication channel 341.

Propulsion mechanism 384 is coupled to be driven by processing logic 313. Processing logic 313 may drive propulsion mechanism 384 based on data received from communication interface 320, measurements of wireless energy receiving module 393, and/or locations provided by location sensor 353. Propulsion mechanism 384 may include one or more propellers for flight or underwater navigation. Propulsion mechanism 384 may include wheels and corresponding transmission or torque conversion hardware in the case of electric vehicles, for example. In some embodiments, propulsion mechanism may include tracks in the context of forklifts or land-based robots for example. Other propulsion mechanism examples may be used in accordance with embodiments of this disclosure.

The term "processing logic" (e.g. 243 or 313) in this disclosure may include one or more processors, microprocessors, multi-core processors, and/or Field Programmable Gate Arrays (FPGAs) to execute operations disclosed herein. In some embodiments, memories (not illustrated) are integrated into the processing logic to store instructions to execute operations and/or store data. Processing logic may include analog or digital circuitry to perform the operations disclosed herein. A "memory" or "memories" (e.g. 251 or 307) described in this disclosure may include volatile or non-volatile memory architectures.

Figure 4:
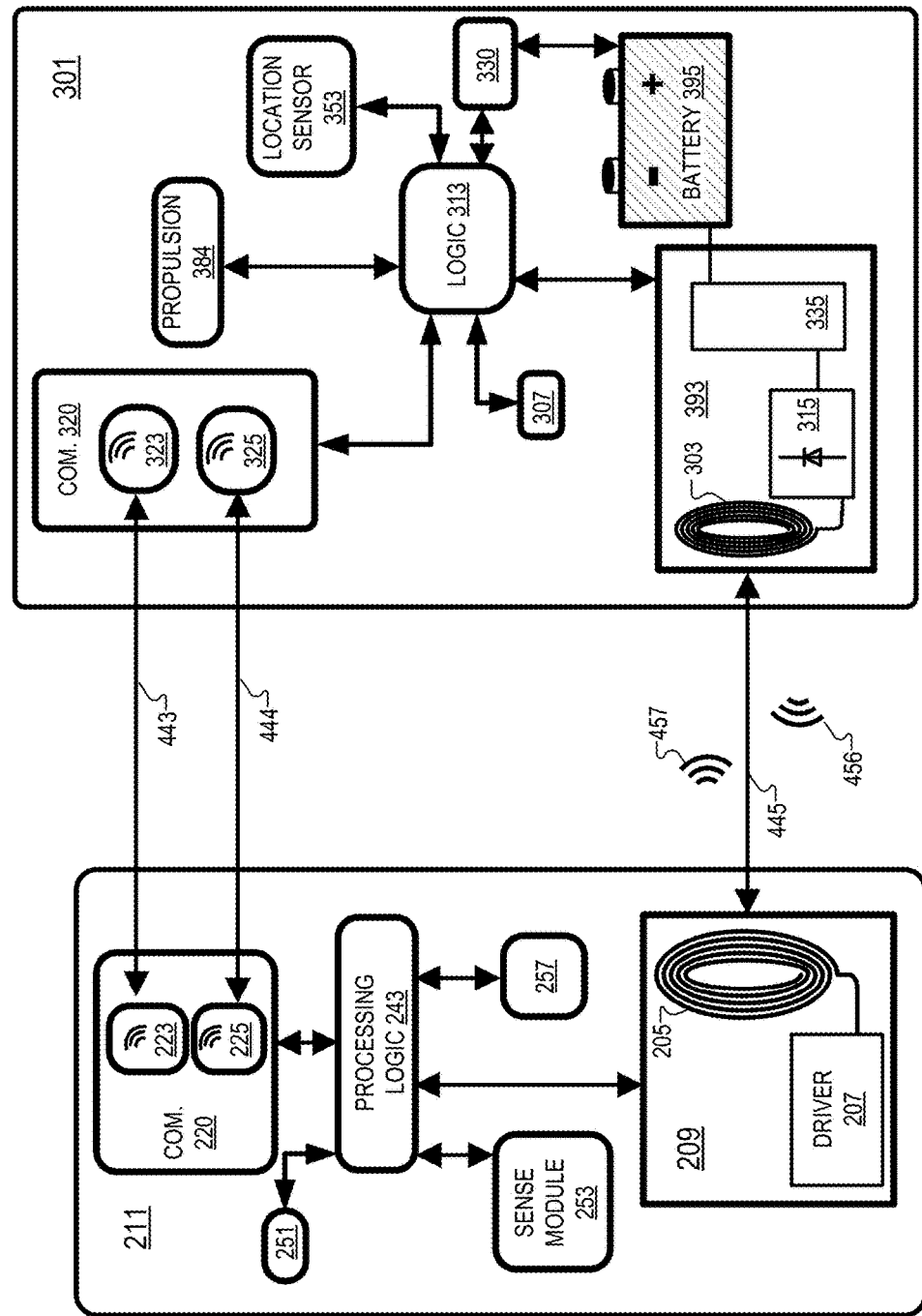
FIG. 4 illustrates an example system that includes a wireless charger and a device configured to receive wireless energy from the wireless charger, in accordance with an embodiment of the disclosure.

FIG. 4 illustrates an example system 400 that includes wireless charger 211 and device 301 configured to receive wireless energy from the wireless charger 211, in accordance with an embodiment of the disclosure. FIG. 4 shows that wireless charger 211 may communicate with device 301 via communication channels 443, 444, and/or 445. In some embodiments, all three of communication channels 443, 444, and 445 are utilized. Transmit charging coil 205 may deliver wireless energy 457 to receive charging coil 303. Wireless power transmitter 209 may be driven by processing logic 243 to selectively transmit the wireless energy 457 to receive charging coil 303 as a technique to encode data in the transmission of wireless energy 457. Similarly, wireless energy receiving module 393 may be driven by processing logic 313 to selectively reflect the wireless energy 457 as reflected wireless energy 456 and encode data into the reflected wireless energy 456. Hence, communication channel 445 may include one-way and/or two-way communication between wireless power transmitter 209 and wireless energy receiving module 393.

Figure 5:
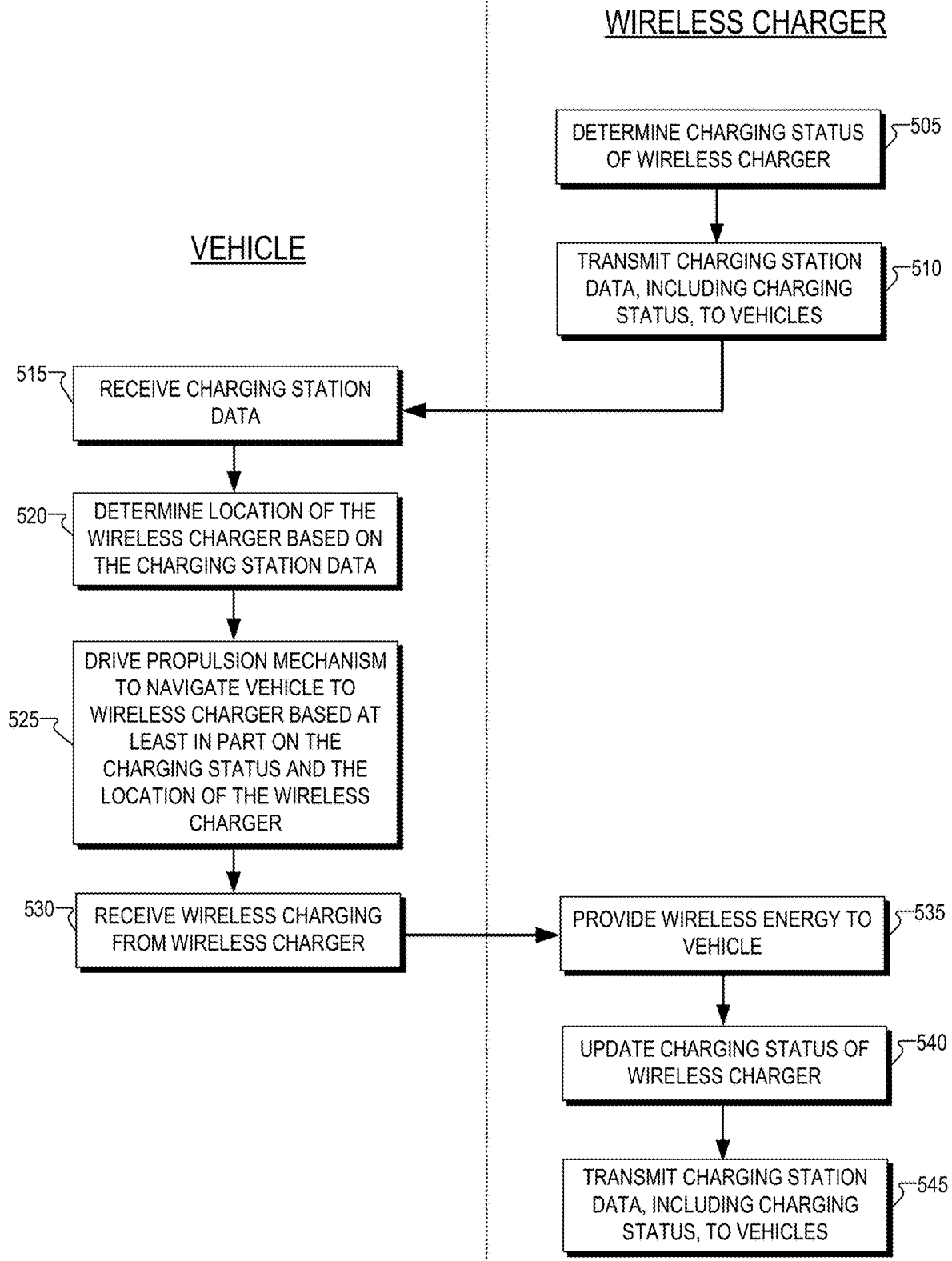
FIG. 5 illustrates a flow chart of an example process of identifying a wireless charger availability to charge a vehicle, in accordance with an embodiment of the disclosure.

FIG. 5 illustrates a flow chart of an example process 500 of identifying a wireless charger availability to charge a vehicle, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In process block 505, a wireless charger (e.g. wireless charger 211) determines a charging status of the wireless charger. Determining a charging status may include processing logic 243 receiving a status signal from sense module 253 that indicates whether a vehicle is currently being charged by wireless power transmitter 209. The charging status of wireless charger 211 may be updated to indicate that a vehicle is being charged based on the status signal from sense module 253. The status signal may be activated based on signals from the sensors included in sense module 253. In one embodiment, determining a charging status includes measuring one or more electrical characteristics of an amplifier providing a signal to transmit charging coil 205. An amplifier using significant power may indicate ongoing wireless charging and thus the charging status may be updated to indicate that a vehicle is being charged. In one embodiment, determining a charging status includes driving a challenge signal onto an RFID interface included in communication interface 220. If a valid response from an RFID tag is received by the RFID interface, a vehicle having the RFID tag is proximate to wireless charger 211.

In process block 510, the wireless charger transmits its charging station data to vehicles. As described with respect to FIG. 1, the transmission of charging station data may include broadcasting the charging station data on different communication channels. The charging station data may include a location (e.g. GPS coordinates) of the wireless charger and/or a charging station identifier. The charging station data may also include a charging status of the wireless charger.

In process block 515, a vehicle receives the charging station data. The charging station data may be received by the vehicle via a wireless communication channel 141/341.

In process block 520, a location of the wireless charger is determined by the vehicle based on the charging station data. If the charging station data includes a charging station identifier, the charging station identifier may be used by the vehicle to ascertain the location of the wireless charger. A relational database may have locations of wireless chargers corresponding to the charging station identifier, for example. The relational database may be stored in a memory of the vehicle (e.g. 307) or be stored remotely and access by the vehicle using communication interface 320, for example. If the charging station data includes GPS coordinates, for example, the location of the wireless charger can be determined from the GPS coordinates.

In process block 525, the propulsion mechanism (e.g. 384) of the vehicle is driven to navigate the vehicle to the wireless charger based at least in part on the charging status and the location of the wireless charger. In one embodiment, driving the propulsion mechanism to navigate the vehicle includes driving the vehicle to the wireless charger when the charging status indicates a charging availability to deliver wireless energy to the receive charging coil of the vehicle. If the charging status of the wireless charger indicates that the wireless charger is charging another vehicle, the vehicle may not navigate to that wireless charger. In one embodiment, the vehicle navigates to the closest wireless charger that is unoccupied (not currently charging another vehicle). In one embodiment, the propulsion mechanism may be driven to navigate to a particular wireless charger based on the location of the wireless charger, the charging status of the wireless charger, and/or a battery voltage of the vehicle. If the battery voltage of the vehicle is particularly low and the range of the vehicle is therefore limited, the vehicle may navigate to the closest wireless charger even though the wireless charger is currently charging another vehicle, for example.

In process block 530, the vehicle receives wireless charging from the wireless charger and in process block 535, the wireless charger provides wireless energy to the vehicle. Of course, process blocks 530 and 535 may happen contemporaneously.

In process block 540, the vehicle updates its charging status to indicate that it is currently charging a vehicle. In process block 545, the wireless charger transmits charging station data that includes its updated charging status to vehicles. The charging station data may be transmitted by the communication interface 220.

In one embodiment, process 500 further includes the vehicle transmitting, with a wireless communication interface, a navigation message to the wireless charger. This transmission may occur subsequent to process block 520 being executed. The navigation message may indicate that the vehicle is navigating toward the wireless charger for wireless charging. The wireless charger may receive the navigation message from the vehicle. In response to receiving the navigation message from the vehicle, the wireless charger may transmit queue data that includes a number of vehicles that are navigating toward the wireless charger. Providing queue data to vehicles via this transmission may allow the vehicles to determine a preferable wireless charger to navigate to. For example, if the queue data from a first wireless charger indicates that six vehicles are navigating to a first wireless charger while queue data from a second wireless charger indicates only two vehicles are navigating to the second wireless charger, this may factor into a navigation decision by the vehicle.

As described briefly above, each vehicle may receive charging station data from a plurality of wireless chargers and a vehicle may determine which wireless charger to navigate to for wireless charging based on receiving the charging station data from multiple wireless chargers. Hence, in one embodiment of process 500, the vehicle may receive second charging station data that includes a second charging status of a second wireless charger. The vehicle may determine a second location of the second wireless charger and navigate the vehicle either to the first wireless charger or the second wireless charger based at least in part on the charging status and location of the first wireless charger and the second charging status and second location of the second wireless charger. The vehicle may receive charging station data from many (more than two) wireless chargers and select from among the many wireless chargers and navigate to the selected wireless charger based on the charging station data from all the many wireless chargers.

In one embodiment of process 500 where the vehicle is receiving charging station data from multiple wireless chargers, the initial charging station data include a first remaining charge time of a device being charged by the initial wireless charger and the second charging station data includes second remaining charge time of a device being charged by the second wireless charger. Here, even if two wireless chargers are at roughly the same distance from a vehicle and the charging status of each of the wireless chargers indicates they are currently charging a device, a remaining charge time of the device may assist the vehicle in determining which wireless charger to navigate to. The wireless charger (e.g. 211) may generate a remaining charge time from a battery voltage measurement of a vehicle being currently charged and reported to the wireless charger via the communication interface (e.g. 320) of the vehicle presently being charged. The battery voltage may be measured by a measurement module (e.g. 330) of the vehicle. In one embodiment, the wireless charger may generate a remaining charge time from a battery current measurement, battery state of health, battery state of charge, or battery capacity remaining of a vehicle being currently charged and reported to the wireless charger via the communication interface (e.g. 320) of the vehicle presently being charged.

Figure 6:
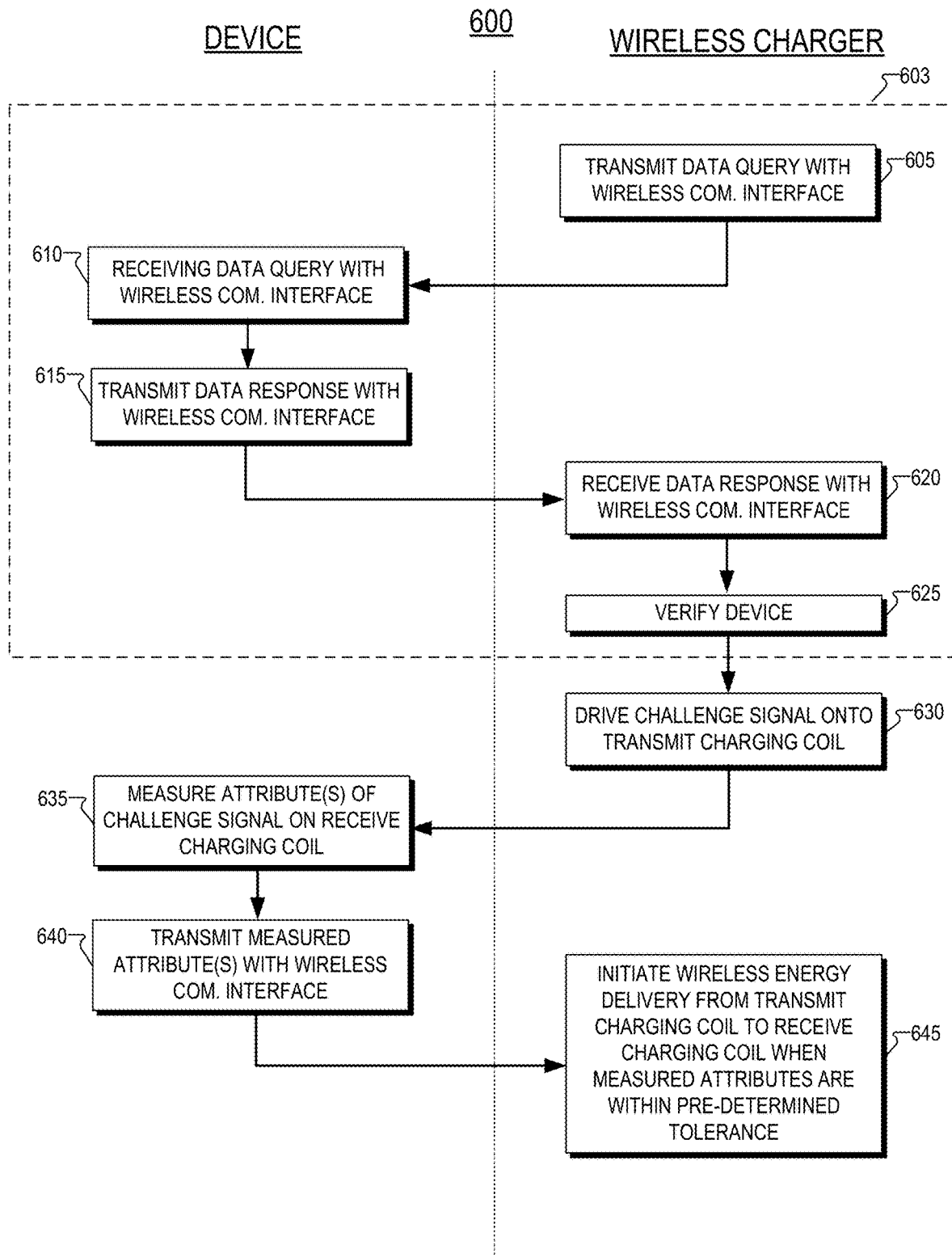
FIG. 6 illustrates a flow chart of an example process of dual-band communication for authenticating a device for wireless charging, in accordance with an embodiment of the disclosure.

FIG. 6 illustrates a flow chart of an example process of dual-band communication for authenticating a device for wireless charging, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

Wireless chargers servicing fleets of vehicles may need to authenticate whether a particular vehicle is authorized to be charged by the wireless charger. Various wireless communication protocols are vulnerable to being compromised by attacks from bad actors or even inadvertent access. Thus, authenticating schemes for authenticating devices and/or selecting devices for charging by wireless chargers may benefit from increased authentication and corresponding security.

In operation 603 of FIG. 6, a communication link is established between a wireless charger (e.g. 211) and a device (e.g. 311) configured to receive wireless energy from the wireless charger. In the example process 600, operation 603 includes process blocks 605, 610, 615, 620, and 625. However, alternatives to the illustrated process blocks may be used to establish a communication link between a wireless charger and a device.

In the illustrated example operation 603, process block 605 includes transmitting a data query with a wireless interface of the wireless charger. In process block 610, the data query is received by a wireless communication interface of the device. In process block 615, a data response is transmitted by the wireless communication interface of the device and in process block 620, the data response is received by the wireless communication interface of the wireless charger.

In process block 625, the device is verified by the wireless charger. Verifying the device may include checking the data response against a list of verified devices where the data response includes a device identifier. In one embodiment, verifying the device includes comparing the data response to an expected response from devices that are authorized to be charged by the wireless charger. In example process 600, after the device is verified, process 600 proceeds to process block 630.

In process block 630, an authentication challenge signal is driven onto a transmit charging coil (e.g. transmit charging coil 205). The data query of process block 605 may be transmitted prior to the authentication challenge signal. In one embodiment, the data query is transmitted while the authentication challenge signal is driven onto the transmit charging coil. In one embodiment, driving the authentication challenge signal onto the transmit charging coil includes modulating at least one of a frequency or duty cycle of the authentication challenge signal. The authentication challenge signal may be driven within a second frequency range that is different from a first frequency range of the communication link established in operation 603. In one embodiment, the authentication challenge signal is approximately 13.56 MHz and the communication link is approximately 2.4 GHz and utilizes IEEE 802.11 protocols. The authentication challenge signal driven onto the transmit charging coil may be approximately 13.56 MHz+/−7 kHz, 6.78 MHz+/−15 kHz, or 80-250 kHz. The communication link of operation 603 may utilize frequencies such as 400 MHz and 915 MHz.

In process block 635, the device measures at least one electrical attribute of the authentication challenge signal received by a receive charging coil (e.g. 303) of the device. In one embodiment, the measured electrical attribute is a rectified voltage of the received authentication challenge signal on rectifier 315. In one embodiment, the measured electrical attribute is a battery current supplied to charge a battery (e.g. 395) of the device.

In one embodiment, the authentication challenge signal is encoded with data and measuring the electrical attribute of the authentication challenge signal includes performing a series of measurements to decode data encoded into the authentication challenge signal. For example, a series of measurements of the rectified voltage can decode digital values encoded into the authentication challenge signal.

In process block 640, the measured electrical attribute(s) are transmitted to the wireless charger as an authentication response signal with the wireless communication interface of the device. The authentication response signal indicates a receipt of the authentication challenge signals since the authentication response signal includes electrical attributes/ measurements of the authentication challenge signal.

In process block 645, the wireless charger initiates a wireless energy delivery from the transmit charging coil of the wireless charger to the receive charging coil of the device when the received measured attributes are within a pre-determined range. For example, if a rectified voltage is the measured electrical attribute, the measured attribute would need to be within a particular voltage range for verification purposes for the wireless charger to initiate a wireless energy delivery. The pre-determined range may be a digital value when the authentication challenge signal is encoded with digital data and the measured attribute includes the digital data decoded by the device.

Process 600 thus facilitates a dual-band authentication of devices that are presented for wireless charging since the authentication includes both wireless communication at the first frequency range in addition to some measurement of an authentication challenge signal of a second frequency range different from the first frequency range. The specific hardware required to measure the authentication challenge signal decreases the likelihood that the authentication scheme of process 600 will be compromised by a bad actor or inadvertent access to wireless charging would be granted. Advantageously, the dual-band authentication of process 600 utilizes the transmit charging coil of the wireless charger and the receive charging coil of the device that are already configured to send and receive, respectively, wireless energy.

In some embodiment, additional verification procedures are performed prior to wirelessly charging the device with the wireless charger. The additional verification procedures may include security and safety procedures. In one embodiment, an RFID tag on the device is also verified by an RFID reader of the wireless charger to provide further assurance that the proximate device is authorized to be receiving wireless charging from the wireless charger.

Figure 7:
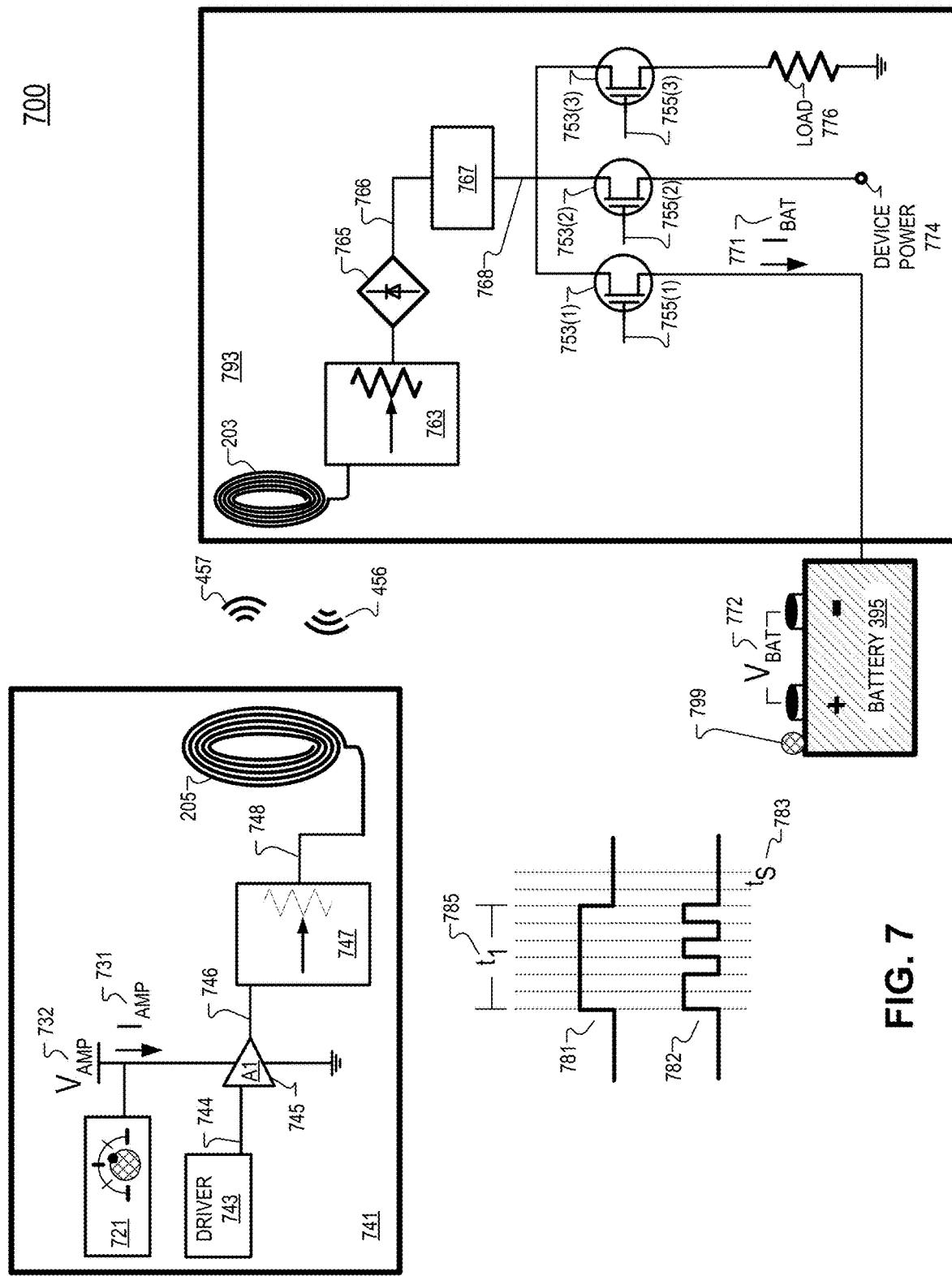
FIG. 7 illustrates a system including a wireless power transmitter and a wireless energy receiving module including a receive charging coil, in accordance with an embodiment of the disclosure.

FIG. 7 illustrates a system 700 including a wireless power transmitter 741 and a wireless energy receiving module 793 including a receive charging coil 203, in accordance with an embodiment of the disclosure. Example wireless power transmitter 741 may be included in wireless charger 211 and processing logic 243 may be coupled to control wireless power transmitter 741. Wireless power transmitter 741 includes a driver 743 to generate a transmitter signal 744. Amplifier 745 is coupled to receive the transmitter signal 744 from driver 743 and generate amplified transmitter signal 746 at an output of the amplifier 745. Driver 743 may include a radio-frequency generator with a programmable amplitude, frequency or duty cycle. An amplifier voltage 732 and amplifier current 731 are provided to amplifier 745. Voltage tuner 721 is coupled to adjust the amplifier voltage 732. Voltage tuner 721 may include a switching power supply with a programmable voltage output. In one embodiment, voltage tuner 721 includes a programmable potentiometer that is controlled by processing logic (e.g. 243). In embodiments where voltage tuner 721 is a programmable potentiometer, one node of the potentiometer may be coupled to the amplifier voltage 732 and the other node may be coupled to amplifier 745. In one embodiment, a digital-analog converter (DAC) is included in voltage tuner 721 to adjust the amplifier voltage 732. The DAC may be coupled to receive digital values from processing logic (e.g. 243). Wireless power transmitter 741 also includes an impedance network 747 coupled to receive the amplified transmitter signal 746 and coupled to transmit an authentication challenge signal 748 onto transmit charging coil 205. An imped-ance of the impedance network 747 may be adjusted to modulate the authentication challenge signal 748 that is driven onto transmit charging coil 205.

The authentication challenge signal may also be modulated by adjusting the duty cycle, amplitude and/or the frequency of the transmitter signal 744 generated by driver 743. In one embodiment, the authentication challenge signal may also be modulated by adjusting the amplifier voltage 732 provided to power amplifier 745, which influences the magnitude of the authentication challenge signal.

Example wireless energy receiving module 793 includes receive charging coil 203, an impedance network 763, a rectifier 765, and a power converter 767. FIG. 7 also includes a battery 395 having a battery voltage 772 and the battery 395 is coupled to the wireless energy receiving module 793. Wireless energy receiving module 793 is an example wireless energy receiving module that may be included in device 301. Impedance network 763 is coupled between receive charging coil 203 and rectifier 765. Power converter 767 is coupled to generate converted voltage 768 and coupled to receive the rectified voltage 766 from rectifier 765. One or more capacitors (not illustrated) and other filtering circuitry may be coupled to rectifier 765 to smooth rectified voltage signal 766. Power converter 767 may include a linear regulator, switching power supply, or other dc-dc converters known in the art.

Wireless energy receiving module 793 also includes switches 753(1), 753(2), and 753(3) coupled to receive converted voltage 768. In FIG. 7, switches 753(1), 753(2), and 753(3) are illustrated as transistors having gates 755(1), 755(2), and 755(3), respectively. Gates 755(1), 755(2), and 755(3) may be controlled by processing logic 313 when wireless energy receiving module 793 is included in device 301. When switch 753(1) is closed, battery current 771 charges battery 395. In some embodiments, when switch 753(2) is closed, converted voltage 768 is provided as device power 774 to a device that includes wireless energy receiving module 793. When switch 753(3) is closed, load 776 receives converted voltage 768. In one embodiment, (not illustrated) the one or more of switches 753 are replaced with a conductor (e.g. copper trace) to provide converted voltage 768 directly to battery 395, device power 744, and/or load 776.

FIG. 7 shows a signal 281 representative of an authentication challenge signal received by wireless energy receiving module 793. The actual waveform of a received authentication challenge signal may be different in practice depending on how much filtering is applied to the signal. For illustrations purposes, a signal similar to signal 281 may be present as rectified voltage 766. Processing logic (e.g. 313) may be coupled to sample the rectified voltage 766 at a given sampling time interval 783. Processing logic 313 may include an analog-to-digital converter (ADC) to sample rectified voltage 766. In one embodiment, a digital symbol is included in the authentication challenge signal. For signal 781, the digital symbol may be the number 252 (binary 11111100) whereas the digital symbol for signal 782 may be 212 (binary 11010100). Processing logic that samples rectified voltage signal 766 may decode the digital symbol. An authentication response signal sent from device 301 to wireless charger 211 may include the digital symbol for authentication purposes, in some embodiments. The authentication response signal may be encoded into reflected wireless energy 456 and/or sent as data 372 via communication channel 341.

In some embodiments, a time period t1 785 that signal 781 is activated serves as the authentication challenge signals and the time period t1 785 is measured by processing logic (e.g. 313) and the time period t1 785 is included in the authentication response signal. In some embodiments, a magnitude of signal 781 serves as the authentication challenge signals and the magnitude of signal 781 is measured by processing logic (e.g. 313) and that magnitude is included in the authentication response signal. In some embodiments, the magnitude of an authentication challenge signal is measured at a plurality of moments in time and the plurality of measurements is included in the authentication response signal.

Figure 8:
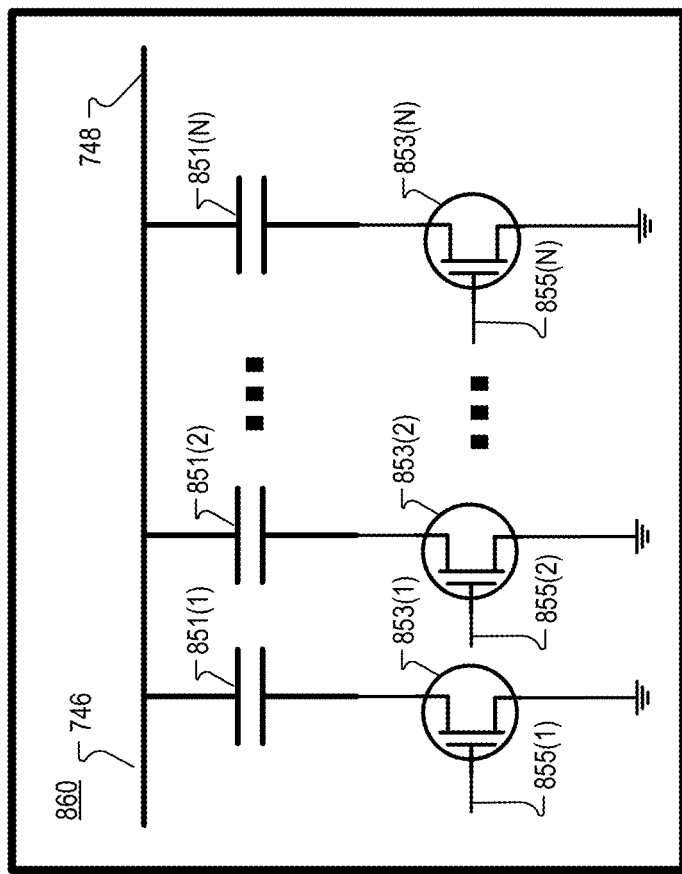
FIG. 8 includes an example impedance network, in accordance with an embodiment of the disclosure.

FIG. 8 includes an example impedance network 860, in accordance with an embodiment of the disclosure. Impedance network 860 may be used as impedance network 747 and/or 763, although impedance network 860 is illustrated for use with impedance network 747 in FIG. 8. Example impedance network 860 includes capacitors 851(1), 851(2), and 851(N) coupled to receive amplified transmitter signal 746, where "N" is the number of capacitors in impedance network 860. In the illustrated embodiment, each capacitor 851 is coupled to a corresponding switch 853. In FIG. 8, switches 853(1), 853(2), and 853(N) are illustrated as transistors having gates 855(1), 855(2), and 855(N), respectively. Gates 855(1), 855(2), and 855(N) may be controlled by processing logic 243 when impedance network 860 is included in impedance network 747. When a switch 853 is off (open), its corresponding capacitor 851 does not influence amplified transmitter signal 746. However, when a switch 853 is on (closed), its corresponding capacitor 851 will influence amplified transmitter signal 746. Therefore, turning on and off switches 853 (via gate voltages 855) will selectively add or subtract capacitance and thus influence amplified transmitter signal 746 that is driven onto transmit charging coil 205 as authentication challenge signal 748. It is understood that impedance network 860 is an example for illustration purposes and that other impedance elements (e.g. resistors and inductors) can be used similarly to add or subtract impedance, in series or in parallel, to an impedance network to influence signal 746 and 748. When impedance network 860 is included in impedance network 763, gates 855(1), 855(2), and 855(N) may be controlled by processing logic 313 to influence the impedance of receive charging coil 203.

Figure 9:
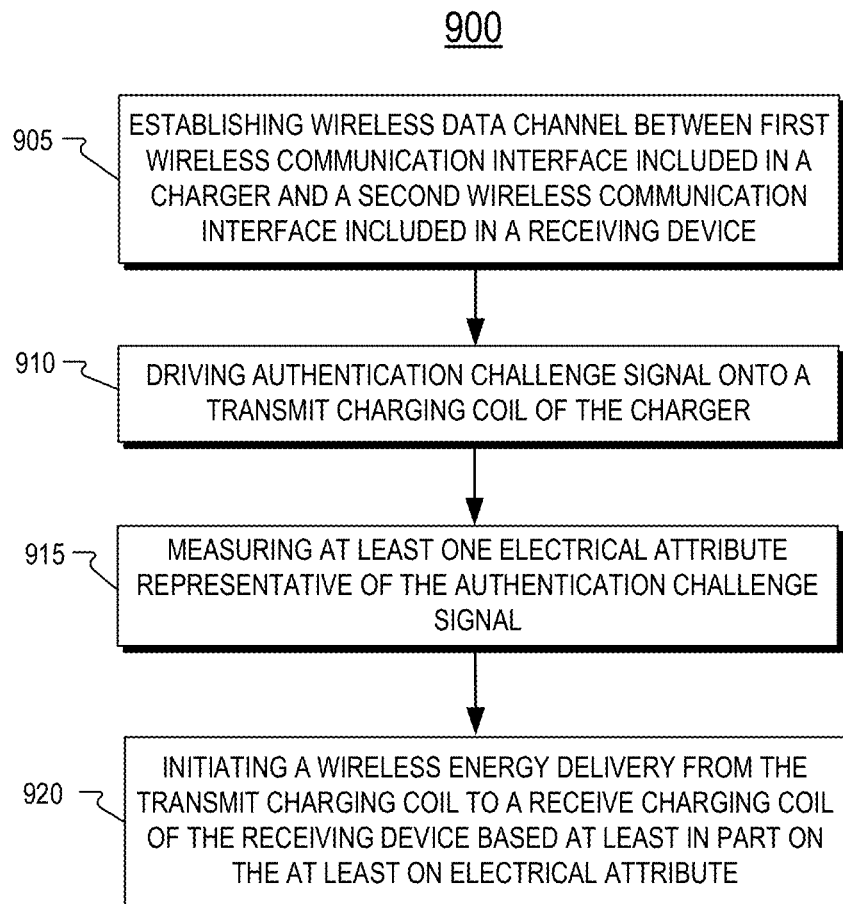
FIG. 9 illustrates a flow chart of an example process of authentication for wireless charging, in accordance with an embodiment of the disclosure.

FIG. 9 illustrates a flow chart of an example process of authentication for wireless charging, in accordance with an embodiment of the disclosure. The order in which some or all of the process blocks appear in process 900 should not be deemed limiting. Rather, one of ordinary skill in the art having the benefit of the present disclosure will understand that some of the process blocks may be executed in a variety of orders not illustrated, or even in parallel.

In process block 905, a wireless data channel is established between a first wireless communication interface (e.g. 223) included in a charger and a second wireless communication interface (e.g. 323) included in a receiving device. The particular technique for establishing the wireless data channel may vary. In one embodiment, the technique disclosed in operation 603 of FIG. 6 is utilized. WiFi, Bluetooth, Zigbee, WirelessHART, and/or other protocols may be used for the wireless data channel.

In process block 910, transmit circuitry (e.g. 721, 843 745, and/or 747) included in the charger drives an authentication challenge signal onto a transmit charging coil included in the charger. The authentication challenge signal is included in wireless energy 456 in this embodiment. In one embodiment, driving the authentication challenge signal onto the transmit charging coil includes modulating at least one of a frequency, amplitude, or duty cycle of the authentication challenge signal. In one embodiment, driving the authentication challenge signal onto the transmit charging coil includes adjusting an amplifier voltage of an amplifier (e.g. 765) having an amplifier output coupled to the transmit charging coil. In one embodiment, driving the authentication challenge signal onto the transmit charging coil includes adjusting an impedance of an impedance network (e.g. 747) coupled to the transmit charging coil. In some embodiments, some combination of adjusting the amplifier voltage or current of the amplifier, adjusting the impedance of the impedance network, and adjusting the duty cycle, amplitude and/or frequency of the authentication signal is utilized to generate a unique authentication challenge signal. On the receiving device, measuring the rectified voltage (e.g. 766) and/or the battery current (e.g. 771) may assist in measuring the authentication challenge signal.

In process block 915, at least one electrical attribute generated by the authentication challenge signal being driven onto the transmit charging coil is measured. The at least one electrical attribute may be measured while the authentication challenge signal is being driven onto the transmit charging coil.

In one embodiment, the at least one electrical attribute generated by the authentication challenge signals being driven onto the transmit charging coil is measured on the receiving device. Measuring the at least one electrical attribute generated by the authentication challenge signals being driven onto the transmit charging coil may include measuring a receiver electrical attribute of an electrical component coupled to a receive charging coil of the receiving device. The receiver electrical attribute may be transmitted from the second wireless communication interface of the receiving device to the first wireless communication interface of the charger. In one embodiment, the receiver electrical attribute is a rectified voltage (e.g. 766) from a rectifier (e.g. 765) coupled to the receive charging coil.

In one embodiment, the at least one electrical attribute generated by the authentication challenge signals being driven onto the transmit charging coil is measured on the charger. For example, the amplifier voltage 732 or amplifier current 731 may be measured as the at least one electrical attribute when an authentication response signal is generated by modulating the impedance of receive charging coil 203. In other words, measuring amplifier voltage 732 or amplifier current 731 while the authentication challenge signal is being driven onto transmit charging coil 205 is one technique for measuring the authentication response signal when the authentication response signal is generated by impedance modulation of impedance network 763, for example. In this embodiment, the receiving device (e.g. 301) may sense a signal on the receive charging coil 203. Sensing a signal may include periodically sampling the rectified voltage 766 and comparing the sampling to a voltage threshold, for example. In response to sensing the signal, an impedance of impedance network 763 may be modulated to generate an authentication response signal. Modulating the impedance of receive charging coil 203 may be accomplished my opening and closing switch(es) 853, for example. Wireless energy delivery is more efficient when the transmit charging coil and the receive charging coil are impedance matched. Thus, a higher amount of power is necessary to deliver wireless energy to the receive charging coil when the receive charging coil is impedance mismatched. Consequently, a higher amplifier current 731 provided to amplifier 745 may indicate an impedance mismatch (and less efficient wireless energy transfer) to the receive charging coil. A sagging amplifier voltage 732 may similarly indicate an impedance mismatch caused by the increase in amplifier current 731. If a receiving device selectively matches and mismatches the impedance (e.g. using impedance network 763) of receive charging coil 203, it can effectively communicate an authentication response signal that can be measured by the power that the amplifier 745 requires to send the authentication challenge signal within wireless energy 457.

In process block 920, wireless energy delivery from the transmit charging coil to a receive charging coil of the receiving device is initiated based at least in part on the at least one electrical attribute.

In one embodiment, when a rectified voltage (e.g. 766) is measured and transmitted back to the charger via the established wireless data channel, the charger verifies that the rectified voltage is within an expected range and subsequently initiates the wireless energy delivery. In one embodiment, when a series of electrical measurements of the amplifier voltage and/or current indicates a particular authentication response signal, the charger verifies the authentication response signal and subsequently initiates the wireless energy delivery.

Figure 10:
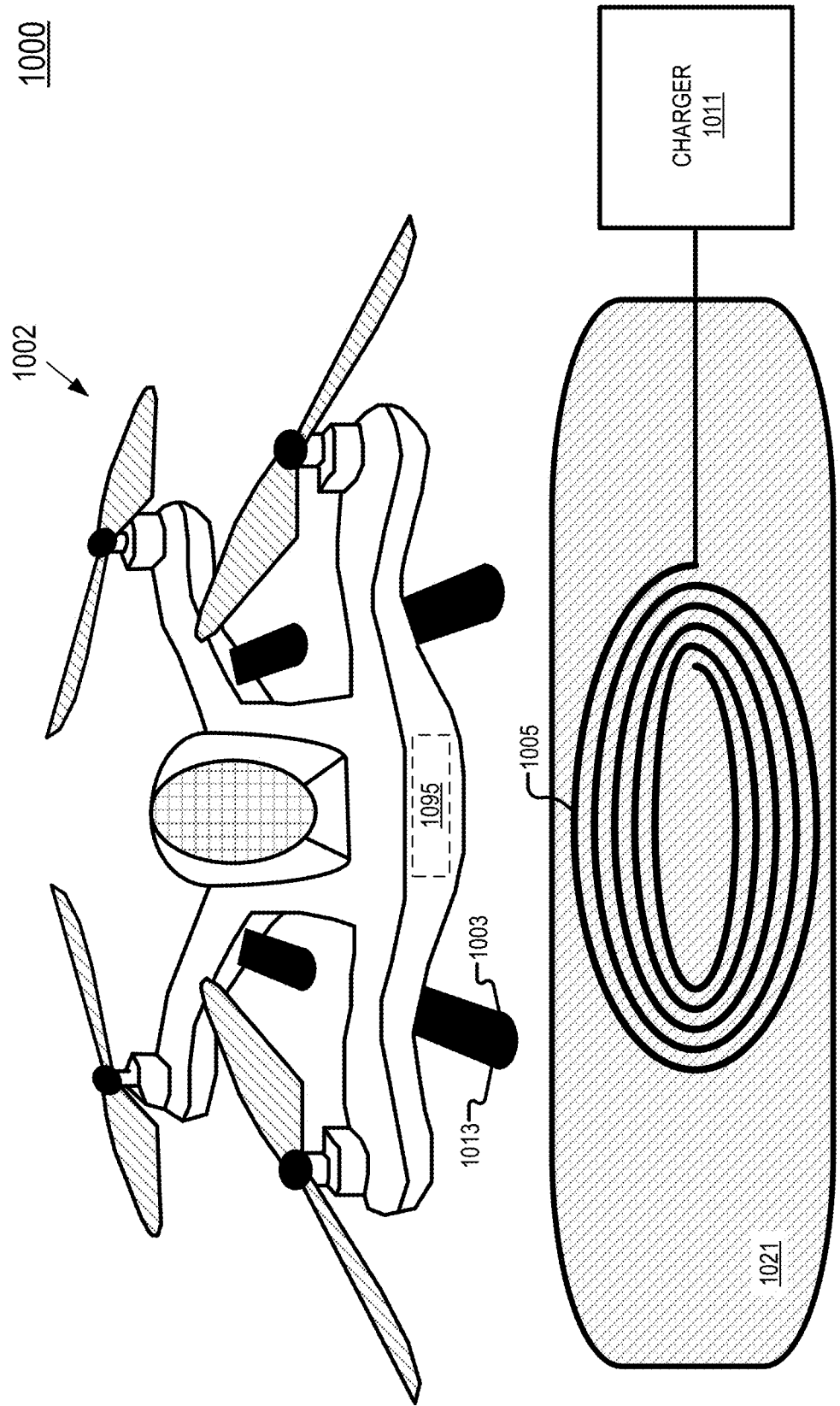
FIG. 10 illustrates an example quadcopter having a receive charging coil, an example transmit charging coil included in a charging mat, and a charger coupled to drive the transmit charging coil, in accordance with an embodiment of the disclosure.

FIG. 10 illustrates an example quadcopter 1002 having a receive charging coil 1003, an example transmit charging coil 1005 included in a landing pad 1021, and a charger 1011 coupled to drive the transmit charging coil 1005, in accordance with an embodiment of the disclosure. Charger 1040 may include the components of charger 211 except that transmit charging coil 205 is replaced with a similar transmit charging coil 1005 included in landing pad 1021. In the illustrated embodiment of FIG. 10, receive charging coil 1003 is coiled around, or integrated into, leg 1013 of quadcopter 1002. In some embodiments, some or all or legs 1013 of quadcopter 1002 may include coils 1003 to facilitate charging of a battery 1095 that powers quadcopter 1002. The components of device 301 (excluding battery 395 and receive charging coil 303) may also be included in quadcopter 1002 to facilitate charging of battery 1095. It is appreciated by those skilled in the art that coils 1003 may be disposed somewhat remote from battery 1095 while still providing the energy via a wire to a wireless energy receiving module (e.g. 393) that converts and provides the wireless energy to battery 1095. When a plurality of receive charge coils 1003 are utilized, they may be coupled to the same rectifier (e.g. 315) so that whichever receive charging coil(s) 1003 that are receiving the wireless energy can deliver the wireless energy to the rectifier.

In a land-based mobile robot system, wall-mountable enclosures that house a charger may be vertically mounted on walls for charging the land-based mobile robots. In an electric vehicle system, a floor-mounted enclosure may be utilized to house the charger (e.g. 211) and the receive charging coil may be mounted in the belly of the vehicle to recharge the electric vehicle's battery or batteries.

In contexts where devices that include batteries are deployed in cold temperatures, battery performance of those devices may suffer from the cold temperatures. In some embodiments, the wireless power transfer system of this disclosure may be utilized to generate heat to keep electronics and batteries warmer to increase performance in colder environments.

In one embodiment, load 776 of FIG. 7 is located proximate to battery 395 and warming the battery 395 includes a charger providing wireless energy 457 to receive charging coil 203 and providing converted voltage 768 to load 776 to generate heat to heat battery 395. In this embodiment, processing logic (e.g. 313) may keep switches 753(1) and 753(2) off while switch 753(3) is turned on to provide converted voltage 768 to load 776 (e.g. resistor network spread around battery 395).

In one embodiment, one or more of impedance network 763, rectifier 765, or power converter 767 is located proximate to battery 395 and warming the battery 395 includes a charger providing wireless energy 457 to receive charging coil 203. These components will generate heat due to receiving the wireless energy 457 and thus heat up battery 395.

In one embodiment, impedance tuning of impedance network 763 is utilized to warm battery 395. Generally, impedance network 763 may be tuned to facilitate efficiency and reduce heat loss due to impedance mismatch between transmit charging coil 205 and receive charging coil 203. However, where heating the battery 395 is a goal, the impedance of impedance network 763 may be adjusted to be purposely inefficient to produce heat for battery 395. By mismatching the impedance of receive charging coil 203, more wireless energy 457 is reflected as reflected wireless energy 456 and heat generation on receive charging coil 203 is a byproduct of the mismatched impedance. Hence, where receive charging coil 203 is disposed proximate to battery 395 and where impedance network 763 is controlled (e.g. by processing logic 313) to create an impedance mismatch, receive charging coil 203 may beneficially generate heat for battery 395 from wireless energy 457. In some embodiments, an impedance of impedance network 747 is adjusted to create an impedance mismatch between transmit charging coil 205 and receive charging coil 203 so that wireless energy 457 generates more heat on receive charging coil 203.

In one embodiment, the magnitude of wireless energy 457 is increased so that the voltage generated on receive charging coil 203 is purposely higher than required to charge battery 395. For example, if power converter 767 generates a converted voltage 768 of 12 VDC and is most efficient when rectified voltage is 14 VDC, the magnitude of wireless energy 457 may be increased such that rectified voltage 766 is 16 VDC so that power converter 767 generates more heat by stepping down a higher voltage (e.g. 16 VDC) to the 12 VDC for charging battery 395. Increasing the magnitude of wireless energy 457 may include increasing the amplifier voltage 732 and/or increasing the gain of amplifier 745. Increasing the magnitude of wireless energy 457 may also include increasing a duty cycle of transmitter signal 744.

In one embodiment to warm battery 395, the battery 395 is charged by turning switch 753(1) on and subsequently battery 395 is discharged by coupling load 776 to battery 395 by closing switches 753(3) and 753(1). The charge/discharge functions can be cycled on and off to keep battery 395 warm. In one embodiment, warming the battery 395 includes increasing the battery current 771 by tuning the gate voltage 755(1) so that the increased battery current 771 generates more heat/power from the electrical components between receive charging coil 203 and battery 395.

In one embodiment, thermal sensor 799 (e.g. a thermistor) is disposed to provide a battery temperature of battery 395. Processing logic 313 may periodically read thermal sensor 799 and when the thermal sensor 799 indicates that the battery temperature has reached a temperature threshold, processing logic 313 may send a message to a charger (e.g. charger 211) to provide heat to battery 395 using wireless energy 457. Both the charger and/or the receiving device that includes the battery 395 may go into a battery warming mode to facilitate warming of battery 395 so that the battery temperature at thermal sensor 799 climbs over the temperature threshold.

Embodiments of the disclosure include systems that allow for and facilitate autonomous operation of a wireless power system. A charger such as wireless charger 211 may operate in a system idle mode when no recognizable devices are in range of charging. In the system idle mode, a microcontroller included in processing logic (e.g. 243) of the charger may be powered on, but the wireless power transmitter (e.g. 209) may be in a low power state where wireless energy 457 is not being delivered. In system idle mode, the charger may continue to periodically broadcast charging station data and transmit the data queries described in association with process block 605.

The charger may enter a heartbeat mode when activity is detected by the charger. Activity may be detected based on a successful establishment of a wireless communication channel as discussed in operation 603. The heartbeat mode may include authenticating one or more devices (e.g. 311) according to processes 600.

Heartbeat mode may also include determining if a device is close enough to begin charging. To determine this, the device may measure the rectified voltage (e.g. 766) and report the rectified voltage to the charger over a wireless communication channel. If the rectified voltage is within a pre-determined range, wireless power transfer is continued by the charger. In one embodiment, the battery voltage (e.g. 772) of the device or amplifier current (e.g. 731) of the charger is used to determine if the device is close enough to begin charging. Using the amplifier current may be advantageous in that it does not require a wireless communication channel to be established between the charger and the device. The charger may also perform measurements to determine whether a device is within a suitable charging distance. For example, the charger may measure an amount of power consumed by amplifier 745. If the power level is above a pre-determined value, the receive charging coil of the device may be too close to the transmit charging coil or there may be an interfering device present.

Furthermore, if a battery is already fully charged or severely discharged, charging the battery may cause damage to the battery and/or charger. Therefore, a device that measures electrical attributes of the battery (e.g. 772) and reports them back to the charger allows the charger to make informed decisions about whether to proceed to a power ramp-up mode of charging the battery. This information also allows the charger to intelligently decide which device to power, when two or more devices are present at a charger. Each device that is proximate to a charger may communicate task priorities such as time until a next task (e.g. a drone flight mission), which may allow the charger to prioritize charging of one of the devices.

The charger (e.g. 211) and device (e.g. 301) may receive and transmit a variety of information that can be stored in their memories. Data stored on the device may be queried by the charger over the wireless communication link. A device may download data or firmware updates via a wireless communication link provided by charger 211, in some embodiments. Therefore, the charger can provide remote updates, security codes, flight plans, task instruction, and other data to the device while the device is charging or at least proximate to the charger.

Examples of data that the charger may record are: 1) number of connections with each device; 2) total amount of charging time for each receiver; 3) battery voltage when the device leaves the charger; 4) battery voltage when the device returns to the charger; 5) timestamps of when each device leaves the charger; 6) build configuration for the charger and the devices; 7) security authentication codes; 8) timestamp of when each device returns to the transmitter; 9) total amount of time the device is away from the charger; 10) voltage and current measurements to monitor power transfer; 11) error states of the charger and/or devices; and 12) preventative maintenance alerts. This data may be transferred from the charger to a network for cloud storage or cloud computing via WiFi or Ethernet, for example. The data may also be wirelessly communicated to the devices.

Examples of data that the device may record includes: 1) number of charge cycles for the device battery; 2) total energy delivered to the device battery; 3) time-stamped measurements of anomalies in the device battery; 4) total energy consumed by the device from the battery; 5) total energy delivered to the device battery; 6) the device battery state of charge; 7) battery lifetime cell charging/balancing statistics; 8) build configuration for the device; and 9) security authentication codes. This data may be wirelessly transferred from the device to the charger and ultimately to a network for cloud storage or cloud computing.

When the authentication of heartbeat mode is completed, the charge may proceed to a power ramp-up mode for devices that are within sufficient operating range of the charger and safety conditions have been met. In one embodiment, the wireless energy receiving module begins to ramp-up the amount of power it delivers to the device or battery of the device. Consequently, the charger increases the amount of power it delivers to the wireless energy receiving module. The wireless energy receiving module may have the ability to control the output voltage (e.g. 768) or current limit of the power delivered to the device. These two parameters can be pre-determined or updated dynamically over the wireless communication link between the charger and the device. The output voltage may be set once at the beginning of the ramp-up mode, but the current limits may be incrementally increased over a period of time. Increasing the current limit allows more current to flow to the device. As the current limit increases, the amount of power being provided by the charger must increase to maintain sufficient power delivery to the device. To do this effectively in real-time, the device may continuously monitor the rectified voltage that is sent back to the charger over the wireless communication channel. If the rectified voltage drops below a predetermined threshold, the charger will increase the amount of power it transmits wirelessly. If the rectified voltage exceeds a threshold, the charger may decrease the amount of power it transmits wirelessly. Other parameters can also be used for this determination, including but not limited to battery voltage, battery current, power amplifier voltage, power amplifier current, and reflected energy. Any of these parameters and/or measurements may be communicated via a wireless communication channel to provide a feedback loop.

After the battery current achieves a predetermined threshold, the power ramp-up mode may transition to a steadier battery charging mode having a constant current, which may be the maximum charge current for the battery. This predetermined current threshold may be maintained throughout the constant-current battery charging mode. The device may continuously monitor the state of the battery and may transition from constant-current to constant-voltage charging as the battery voltage approaches the float voltage (i.e. charge termination voltage) configured for the battery. If the power received by the device reduces (which could be caused by the device shifting around or temperature change of the charger causing it to reduce the amount of power it can deliver), the wireless energy receiving module can dynamically reduce the current delivered to the battery. This feedback loop may also ensure that the wireless energy receiving module will always have a supply of power greater than the power it provides to the battery or device. The charger may continue to monitor the power delivered and decrease the power as the charging power tapers off in constant-voltage charging mode. The receiver may alert the transmitter to terminate charging the battery when the current being drawn by the battery drops below $1/10^{th}$ of the configured constant-current charging rate (the C/10 rate). To prevent overcharging the battery for the case where the devices is drawing more current from the battery than the C/10 rate, the wireless energy receiving module may pause charging after a configured time has elapsed (e.g. 1 to 3 hours), measure the battery voltage and terminate charging if the voltage is with the Recharge Threshold (or approximately 95%) of the float voltage configured for the battery. If the battery voltage is more than the Recharge Threshold below the float voltage, the end of a charge timer may be reset and charging may be resumed. Any of these fault detection or battery conditions can be communicated from the wireless energy receiving module to the device that will allow the device to make an independent decision or a decision can be recommended from the wireless energy receiving module based on that information. An example of such system could be a wireless energy receiving module detecting a battery depletion of an aerial drone. The system can alert the aerial drone to make a safe landing based on a battery fault detection.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An unmanned autonomous vehicle comprising:
    a receive charging coil configured to receive wireless energy from a transmit charging coil of a wireless charger;
    a propulsion mechanism for moving the vehicle;
    a wireless communication interface;
    processing logic coupled to the propulsion mechanism, the wireless communication interface and an energy receiving module comprising the receive charging coil; and
    a computer-readable medium coupled to be accessed by the processing logic, wherein the computer-readable medium includes instructions that, when executed, cause the unmanned autonomous vehicle to perform operations comprising:
        receiving, with the wireless communication interface, charging station data, wherein the charging station data includes a charging status of a wireless charger having a wireless power transmitter configured to deliver the wireless energy to the receive charging coil;
        determining a location of the wireless charger based on the charging station data;
        selecting the wireless charger among a plurality of chargers based at least in part on using as selection factors the charging status and a distance to the location of the wireless charger;
        after selecting, driving the propulsion mechanism to navigate the vehicle to the selected wireless charger; and
        performing a dual-band authentication process comprising:
            receiving an authentication challenge signal from the transmit charging coil of the wireless charger, wherein the receive charging coil receives the authentication challenge signal via a first frequency range, and wherein the first frequency range is driven by the transmit charging coil;
            in response to receiving the authentication challenge signal, measuring a rectified voltage based on the authentication challenge signal, wherein the vehicle is configured to measure the rectified voltage from a rectifier connected to the receive charging coil or a battery voltage of the vehicle;
            transmitting the measured rectified voltage to the wireless charger through the wireless communication interface, wherein the wireless communication interface uses a second frequency range different from the first frequency range;
            wherein the processing logic is configured to drive the receive charging coil to selectively reflect the wireless energy received from the transmit charging coil, wherein selectively reflecting comprises encoding data into the reflected wireless energy, wherein the encoded data comprises an authentication response signal in response to an authentication challenge signal encoded in the wireless energy, wherein the authentication challenge signal comprises a signal for authenticating whether the unmanned autonomous vehicle is authorized to be charged by the wireless charger, and
            wherein the authentication response signal comprises a measured electrical attribute of the authentication challenge signal, the measured electrical attribute comprising a battery current supplied to charge a battery of the unmanned autonomous vehicle.

2. The vehicle of claim 1, wherein driving the propulsion mechanism to navigate the vehicle is based at least in part on the charging station data and includes driving the vehicle to the wireless charger when the charging status indicates an availability of the wireless charger to deliver the wireless energy to the receive charging coil.

3. The vehicle of claim 2, wherein the computer-readable medium includes further instructions that, when executed, cause the vehicle to perform further operations comprising:
transmitting, with the wireless communication interface, a navigation message to the wireless charger, wherein the navigation message indicates that the vehicle is navigating toward the wireless charger for wireless charging.

4. The vehicle of claim 1, wherein the computer-readable medium includes further instructions that, when executed, cause the vehicle to perform further operations comprising:
receiving, with the wireless communication interface, second charging station data, wherein the second charging station data includes a second charging status of a second wireless charger having a second wireless power transmitter configured to deliver the wireless energy to the receive charging coil; and
determining a second location of the second wireless charger,
wherein driving the propulsion mechanism to navigate the vehicle is also based at least in part on the second charging status and the second location of the second wireless charger.

5. The vehicle of claim 4, wherein the charging station data includes a first remaining charge time of a device being charged by the wireless charger, and wherein the second charging station data includes a second remaining charge time of a second device being charged by the second wireless charger, and further wherein driving the propulsion mechanism to navigate the vehicle is also based at least in part on the first remaining charge time and the second remaining charge time.

6. The vehicle of claim 1, wherein the charging station data includes a location of the wireless charger.

7. The vehicle of claim 1, wherein the charging station data includes a charging station identifier of the wireless charger.

8. The vehicle of claim 1, wherein the vehicle is configured to be coupled to the selected wireless charger such that the selected wireless charger determines whether the vehicle is close enough to begin charging by measuring an amplifier current from the selected wireless charger, without utilizing a wireless communication channel established between the vehicle and the selected wireless charger.

9. The vehicle of claim 1, wherein the dual-band authentication process further comprises measuring a battery current supplied to charge a battery of the unmanned autonomous vehicle, wherein the battery current is generated by a power regulator after the receive charging coil receives the authentication challenge signal, and wherein the power regulator is coupled to the rectifier and the battery.

10. The vehicle of claim 1, wherein the first frequency range is adjusted by adjusting an impedance of an impedance network configured to adjust a range of a resonant frequency of the transmit charging coil.

11. The vehicle of claim 1, wherein the measured electrical attribute further comprises a rectified voltage of the authentication challenge signal received on the rectifier.

12. The vehicle of claim 1, wherein the second frequency range is higher than the first frequency range.

13. The vehicle of claim 1, wherein the transmit charging coil delivers the wireless energy to the receive charging coil when the transmit charging coil and the receive charging coil are within a pre-determined range.

14. A computer-implemented method of charging a battery of an unmanned autonomous vehicle, the computer-implemented method comprising:
receiving, via a wireless communication interface of the vehicle, charging station data that includes a charging status of a wireless charger having a wireless power transmitter configured to deliver wireless energy to a receive charging coil of the vehicle, wherein the wireless communication interface uses a second frequency range;
determining a location of the wireless charger based on the charging station data;
selecting the wireless charger among a plurality of wireless chargers based at least in part on using as selection factors the charging status and a distance to the location of the wireless charger;
after selecting, driving a propulsion mechanism of the vehicle to navigate the vehicle to the selected wireless charger;
authenticating the vehicle comprising:
driving a transmit charging coil implemented in the wireless charger to deliver the wireless energy having data encoded therein to the receive charging coil implemented in the vehicle, wherein the encoded data in the wireless energy comprises an authentication challenge signal for authenticating the vehicle;
receiving, by the receive charging coil, the authentication challenge signal transmitted from the transmit charging coil, wherein the receive charging coil receives the authentication challenge signal via a first frequency range different from the second frequency range, and wherein the first frequency range is driven by the transmit charging coil;
measuring, by the vehicle, a rectified voltage based on the authentication challenge signal, wherein the vehicle is configured to measure the rectified voltage from a rectifier connected to the receive charging coil or a battery voltage of the vehicle;
transmitting, by the vehicle, the measured rectified voltage to the wireless charger through the wireless communication interface,
wherein the wireless communication interface uses the second frequency range, wherein the receive charging coil is configured to selectively reflect the wireless energy received from the wireless power transmitter, wherein selectively reflecting comprises encoding data into the reflected wireless energy, wherein the encoded data in the reflected wireless energy comprises an authentication response signal in response to the authentication challenge signal, and
wherein the authentication response signal comprises a measured electrical attribute of the authentication challenge signal, the measured electrical attribute comprising a battery current supplied to charge a battery of the unmanned autonomous vehicle.

15. The computer-implemented method of claim 14, wherein driving the propulsion mechanism to navigate the vehicle based at least in part on the charging station data includes driving the vehicle to the wireless charger when the charging status indicates an availability to deliver the wireless energy to the receive charging coil of the vehicle.

16. The computer-implemented method of claim 15 further comprising:
transmitting, with the wireless communication interface, a navigation message to the wireless charger, wherein the navigation message indicates that the vehicle is navigating toward the wireless charger for wireless charging.

17. The computer-implemented method of claim 14 further comprising:
receiving, with the wireless communication interface, second charging station data, wherein the second charging station data includes a second charging status of a second wireless charger having a second wireless power transmitter configured to deliver the wireless energy to the receive charging coil of the vehicle; and
determining a second location of the second wireless charger, wherein driving the propulsion mechanism to navigate the vehicle is also based at least in part on the second charging status and the second location of the second wireless charger.

18. The computer-implemented method of claim 17, wherein the charging station data includes a first remaining charge time of a device being charged by the wireless charger, and wherein the second charging station data includes a second remaining charge time of a second device being charged by the second wireless charger, and further wherein driving the propulsion mechanism to navigate the vehicle is also based at least in part on the first remaining charge time and the second remaining charge time.

19. The computer-implemented method of claim 14, wherein the vehicle is configured to be coupled to the selected wireless charger such that the selected wireless charger determines whether the vehicle is close enough to begin charging by measuring an amplifier current from the selected wireless charger, without utilizing a wireless communication channel established between the vehicle and the selected wireless charger.

20. The computer-implemented method of claim 14, wherein the authenticating the vehicle further comprises measuring a battery current supplied to charge a battery of the unmanned autonomous vehicle, wherein the battery current is generated by a power regulator after the receive charging coil receives the authentication challenge signal, and wherein the power regulator is coupled to the rectifier and the battery.

21. The computer-implemented method of claim 14, wherein the first frequency range is adjusted by adjusting an impedance of an impedance network configured to adjust a range of a resonant frequency of the transmit charging coil.

22. The computer-implemented method of claim 14, wherein the measured electrical attribute further comprises a rectified voltage of the authentication challenge signal received on the rectifier.

23. The computer-implemented method of claim 14, wherein the second frequency range is higher than the first frequency range.

24. The computer-implemented method of claim 14, wherein the transmit charging coil delivers the wireless energy to the receive charging coil when the transmit charging coil and the receive charging coil are within a pre-determined range.

25. A wireless charger comprising:
a wireless power transmitter including a transmit charging coil to transmit wireless energy;
a sense module coupled to sense whether the wireless power transmitter is charging a device;
processing logic coupled to receive a status signal from the sense module and coupled to control the wireless power transmitter;
a communication interface coupled to the processing logic; and
a computer-readable medium coupled to be accessed by the processing logic, wherein the computer-readable medium includes instructions that, when executed, cause the wireless charger to perform operations comprising:
determining a charging status of the wireless charger; and
transmitting, with the communication interface, the charging status and a location of the wireless charger to vehicles,
wherein the vehicles are unmanned autonomous vehicles, wherein each of the vehicles is configured to:
select the wireless charger among a plurality of wireless chargers based at least in part on using as selection factors the charging status and a distance to the location of the wireless charger;
after selecting, driving a propulsion mechanism of the vehicle to navigate the vehicle to the selected wireless charger;
receive an authentication challenge signal from the transmit charging coil of the wireless charger, wherein the receive charging coil receives the authentication challenge signal via a first frequency range, and wherein the first frequency range is driven by the transmit charging coil;
in response to receiving the authentication challenge signal, measure a rectified voltage based on the authentication challenge signal, wherein the vehicles are configured to measure a rectified voltage from a rectifier connected to the receive charging coil or a battery voltage of the vehicle; and
transmit the measured rectified voltage to the wireless charger through the wireless communication interface, wherein the wireless communication interface uses a second frequency range, and wherein the second frequency range has a different frequency from the first frequency range;
wherein the processing logic is configured to drive the wireless power transmitter to transmit the wireless energy having data encoded therein to the receive charging coil, and wherein the encoded data comprises an authentication challenge signal for authenticating whether the unmanned autonomous vehicles are authorized to be charged by the wireless charger,
wherein the processing logic is further configured to drive the receive charging coil to selectively reflect the wireless energy received from the transmit charging coil, wherein selectively reflecting comprises encoding an authentication response signal in response to the authentication challenge signal encoded in the wireless energy, and
wherein the authentication response signal comprises a measured electrical attribute of the authentication challenge signal, the measured electrical attribute comprising a battery current supplied to charge a battery of the unmanned autonomous vehicle.

26. The wireless charger of claim 25, wherein the computer-readable medium includes further instructions that, when executed, cause the wireless charger to perform further operations comprising:

determining a remaining charge time of the device when a vehicle is being charged by the wireless power transmitter; and transmitting, with the communication interface, the remaining charge time of the vehicle.

27. The wireless charger of claim 25, wherein the computer-readable medium includes further instructions that, when executed, cause the wireless charger to perform further operations comprising:

transmitting, with the communication interface, a charging station identifier of the charger to the vehicles.

28. The wireless charger of claim 25, wherein the computer-readable medium includes further instructions that, when executed, cause the wireless charger to perform further operations comprising:

receiving, with the communication interface, a navigation message from a vehicle, wherein the navigation message indicates the vehicle is navigating toward the wireless charger; and in response to receiving the navigation message:

transmitting, with the communication interface, queue data, wherein the queue data includes a number of vehicles that are navigating toward the wireless charger.

29. The wireless charger of claim 25, wherein determining the charging status of the wireless charger is in response to the status signal from the sense module.

30. The wireless charger of claim 25, wherein the vehicle is configured to be coupled to the selected wireless charger such that the selected wireless charger determines whether the vehicle is close enough to begin charging by measuring an amplifier current from the selected wireless charger, without utilizing a wireless communication channel established between the vehicle and the selected wireless charger.

31. The wireless charger of claim 25, wherein the vehicle is further configured to measure a battery current supplied to charge a battery of the vehicle, wherein the battery current is generated by a power regulator after the receive charging coil receives the authentication challenge signal, and wherein the power regulator is coupled to the rectifier and the battery.

32. The wireless charger of claim 25, wherein the first frequency range is adjusted by adjusting an impedance of an impedance network configured to adjust a range of a resonant frequency of the transmit charging coil.

33. The wireless charger of claim 25, wherein the measured electrical attribute further comprises a rectified voltage of the authentication challenge signal received on the rectifier.

34. The wireless charger of claim 25, wherein the second frequency range is higher than the first frequency range.

35. The wireless charger of claim 25, wherein the transmit charging coil delivers the wireless energy to the receive charging coil when the transmit charging coil and the receive charging coil are within a pre-determined range.

* * * * *